(12) United States Patent
Liu

(10) Patent No.: US 8,788,568 B2
(45) Date of Patent: Jul. 22, 2014

(54) SYSTEM AND METHOD FOR IMPLEMENTING CONCENTRATED ACCESS OF BUSINESS OPERATIONS SUPPORT SYSTEM

(75) Inventor: Xiang Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 215 days.

(21) Appl. No.: 13/258,379

(22) PCT Filed: May 24, 2010

(86) PCT No.: PCT/CN2010/073171
§ 371 (c)(1),
(2), (4) Date: May 3, 2012

(87) PCT Pub. No.: WO2010/145417
PCT Pub. Date: Dec. 23, 2010

(65) Prior Publication Data
US 2012/0221619 A1 Aug. 30, 2012

(30) Foreign Application Priority Data
Nov. 5, 2009 (CN) .......................... 2009 1 0110006

(51) Int. Cl.
*G06F 15/16* (2006.01)
*H04W 8/12* (2009.01)
(52) U.S. Cl.
CPC ...................................... *H04W 8/12* (2013.01)
USPC ........................................................ 709/201
(58) Field of Classification Search
USPC ................ 709/201, 203; 455/433; 705/30, 34
See application file for complete search history.

(56) References Cited

U.S. PATENT DOCUMENTS

2008/0319884 A1* 12/2008 Yi et al. .......................... 705/34

FOREIGN PATENT DOCUMENTS

CN 101018408 A 8/2007
CN 101472258 A 7/2009

OTHER PUBLICATIONS

International Search Report on international application No. PCT/CN2010/073171, mailed on Sep. 2, 2010.
English Translation of the Written Opinion of the International Search Authority in international application No. PCT/CN2010/073171, mailed on Sep. 2, 2010.

* cited by examiner

*Primary Examiner* — Frantz Jean
(74) *Attorney, Agent, or Firm* — Oppedahl Patent Law Firm LLC

(57) ABSTRACT

The disclosure discloses a system for implementing concentrated access to a Business Operations Support System (BOSS), including: a plurality of HLR subsystems and at least one BOSS subsystem. Correspondingly, the disclosure further discloses a method for implementing concentrated access to a BOSS, including: an HLR subsystem is specified for performing concentrated access to each BOSS subsystem; the BOSS subsystem sends a business processing request to the specified HLR subsystem; the specified HLR subsystem forwards the business processing request to a corresponding HLR subsystem; and the corresponding HLR subsystem feeds the business processing information back to the BOSS subsystem by the specified HLR subsystem. By the system and method, the BOSS system can access to the distributed HLR system only from one concentrated access point without the cross-regional access to the distributed HLR system, so that the network construction cost is reduced.

16 Claims, 5 Drawing Sheets

PRIOR ART

SYSTEM AND METHOD FOR IMPLEMENTING CONCENTRATED ACCESS OF BUSINESS OPERATIONS SUPPORT SYSTEM

TECHNICAL FIELD

The disclosure relates to a mobile communication technology, in particular to a system and method for implementing concentrated access of a Business Operations Support System (BOSS).

BACKGROUND

With the rapid development of mobile communication networks and the rapid increase of the user amount of mobile communications, a large-capacity and distributed Home Location Register (HLR) system in the mobile communication networks has become the development trend of the mobile communication networks in the future.

Since a distributed HLR system has much higher requirements on the user amount and processing capacity than a traditional HLR system, the distributed HLR system generally needs to provide a plurality of data access servers for a BOSS system to perform business acceptance; meanwhile, due to the huge user amount of the distributed HLR system, business acceptance instructions processed by the BOSS system per unit time are also obviously increased, therefore it is necessary to set a plurality of BOSS subsystems in the BOSS system; each BOSS subsystem can access a plurality of data access servers of the distributed HLR system concurrently and the capability of processing business acceptance is improved by distributing business acceptance messages by the BOSS system.

FIG. 1 is a schematic diagram showing the access of a BOSS system to an HLR system in the prior art, as shown in FIG. 1, the BOSS system and the distributed HLR system are two different networks, and the access of the BOSS system to the distributed HLR system needs a special network deployment. However, data access servers of the distributed HLR system are generally distributed at different geographical locations, while the BOSS system generally processes all the acceptance instructions of the terminals of each location centralizedly at one location, therefore, if the BOSS system accesses a plurality of data access servers, a cross-regional network deployment is required, which not only has high requirements on the network deployment, but also reduces the network security of the HLR as the distributed HLR system exposes a plurality of access points to networks besides the distributed HLR.

In addition, the BOSS system does not know the load condition of each component inside the distributed HLR system, therefore, the BOSS system can only adopt a simple distribution policy for the plurality of data access servers of the distributed HLR system.

SUMMARY

The main technical problem to be solved by the disclosure is to provide a system and method for implementing concentrated access of a BOSS without cross-regional access to a distributed HLR system, so as to reduce the network construction cost.

In order to solve the technical problem, the disclosure provides a system for implementing concentrated access of a BOSS, including: a plurality of HLR subsystems and at least one BOSS subsystem, wherein one of the HLR subsystems is specified for performing concentrated access of each BOSS subsystem;

the BOSS subsystem is configured to send a business processing request to the specified HLR subsystem;

the specified HLR subsystem is configured to forward the business processing request to a corresponding non-specified HLR subsystem; and the non-specified HLR subsystem is configured to receive the business processing request forwarded by the specified HLR subsystem and feed business processing information back to the BOSS subsystem through the specified HLR subsystem.

The HLR subsystem may include an HLR database, a concentrated access interface machine and at least one data access server; and the concentrated access interface machine of the specified HLR subsystem may be configured to set up connection with a data access server of each HLR subsystem and exchange the business processing information between the BOSS subsystem and a data access server of the non-specified HLR subsystem by itself.

The HLR subsystem may include an HLR database, a concentrated access interface machine and at least one data access server; and the concentrated access interface machine of the specified HLR subsystem may be configured to set up connection with a concentrated access interface machine of each HLR subsystem and exchange remote business processing information between the BOSS subsystem and a concentrated access interface machine of a remote HLR subsystem by itself.

The concentrated access interface machine of the specified HLR subsystem may be further configured to, through user identifiers included in the business processing request, query and select an object to which the request is to be sent.

The concentrated access interface machine of the specified HLR subsystem may be further configured to select a data access server according to a current load condition of each data access server when a data access server for receiving the business processing information cannot be determined.

The concentrated access interface machine of the specified HLR subsystem may be further configured to update a historical distribution record of the business processing information according to an exchange condition of the business processing information.

A method for implementing concentrated access of a BOSS, includes:

an HLR subsystem is specified for performing concentrated access of each BOSS subsystem;

the BOSS subsystem sends a business processing request to the specified HLR subsystem and the specified HLR subsystem forwards the business processing request to a corresponding HLR subsystem; and the corresponding HLR subsystem feeds the business processing information back to the BOSS subsystem through the specified HLR subsystem.

The step that the specified HLR subsystem queries the business processing request and forwards the business processing request to the corresponding HLR subsystem may be: a concentrated access interface machine of the specified HLR subsystem parses the business processing request, queries it in a historical distribution record of the business processing information, determines a data access server corresponding to the business processing request, and forwards the business processing request to the data access server; and the step that the corresponding HLR subsystem feeds the business processing information back to the BOSS subsystem through the specified HLR subsystem may be: the data access server feeds the business processing information back to the BOSS subsystem through the concentrated access interface machine of the specified HLR subsystem.

The step that the specified HLR subsystem queries the business processing request and forwards the business processing request to the corresponding HLR subsystem may be: the concentrated access interface machine of the specified HLR subsystem parses the business processing request and queries it in a historical distribution record of the business processing information; the concentrated access interface machine of the specified HLR subsystem uploads a local business processing request to a corresponding local data access server; and the concentrated access interface machine of the specified HLR subsystem determines a concentrated access interface machine corresponding to a remote business processing request and forwards the remote business processing request to the corresponding concentrated access interface machine which then uploads the business processing request to a corresponding data access server; and the step that the corresponding HLR subsystem feeds the business processing information back to the BOSS subsystem through the specified HLR subsystem may be: the remote data access server feeds the business processing information back to the BOSS subsystem through the local and remote concentrated access interface machines which forward the information.

The concentrated access interface machine of the specified HLR subsystem may, through user identifiers included in the business processing request, query and select an object to which the request is to be sent.

The method may further include: the concentrated access interface machine of the specified HLR subsystem selects one data access server according to a current load condition of each data access server when a data access server for receiving the business processing information cannot be determined.

After the corresponding HLR subsystem feeds the business processing information back to the BOSS subsystem through the specified HLR subsystem, the method may further include: the concentrated access interface machine of the specified HLR subsystem updates a historical distribution record of the business processing information according to an exchange condition of the business processing information.

The beneficial effects of the disclosure are: when the equipment of a distributed HLR system is distributed at different regions, the distributed HLR system has a plurality of data access servers; by the system and method, a BOSS system can access to the distributed HLR system only from one concentrated access point without cross-regional access to the distributed HLR system; the BOSS system and the equipment of the distributed HLR system are located on different network planes, so that the method can reduce the network construction cost.

DETAILED DESCRIPTION

The disclosure is further described below with reference to drawings and specific embodiments in details.

Embodiment 1

Figure 1:
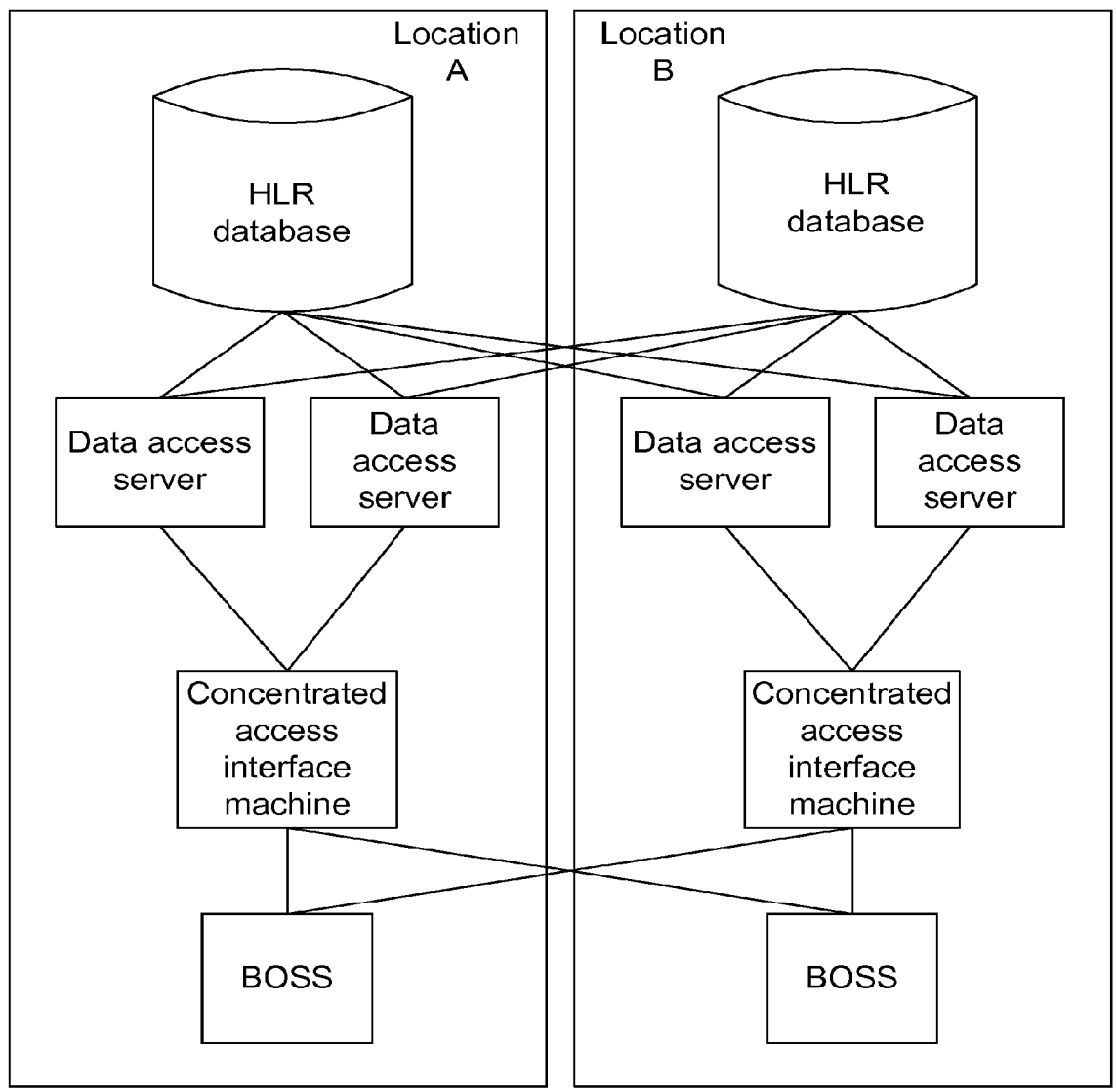
FIG. 1 is a schematic diagram showing the access of a BOSS system to an HLR system in the prior art.
Figure 2:
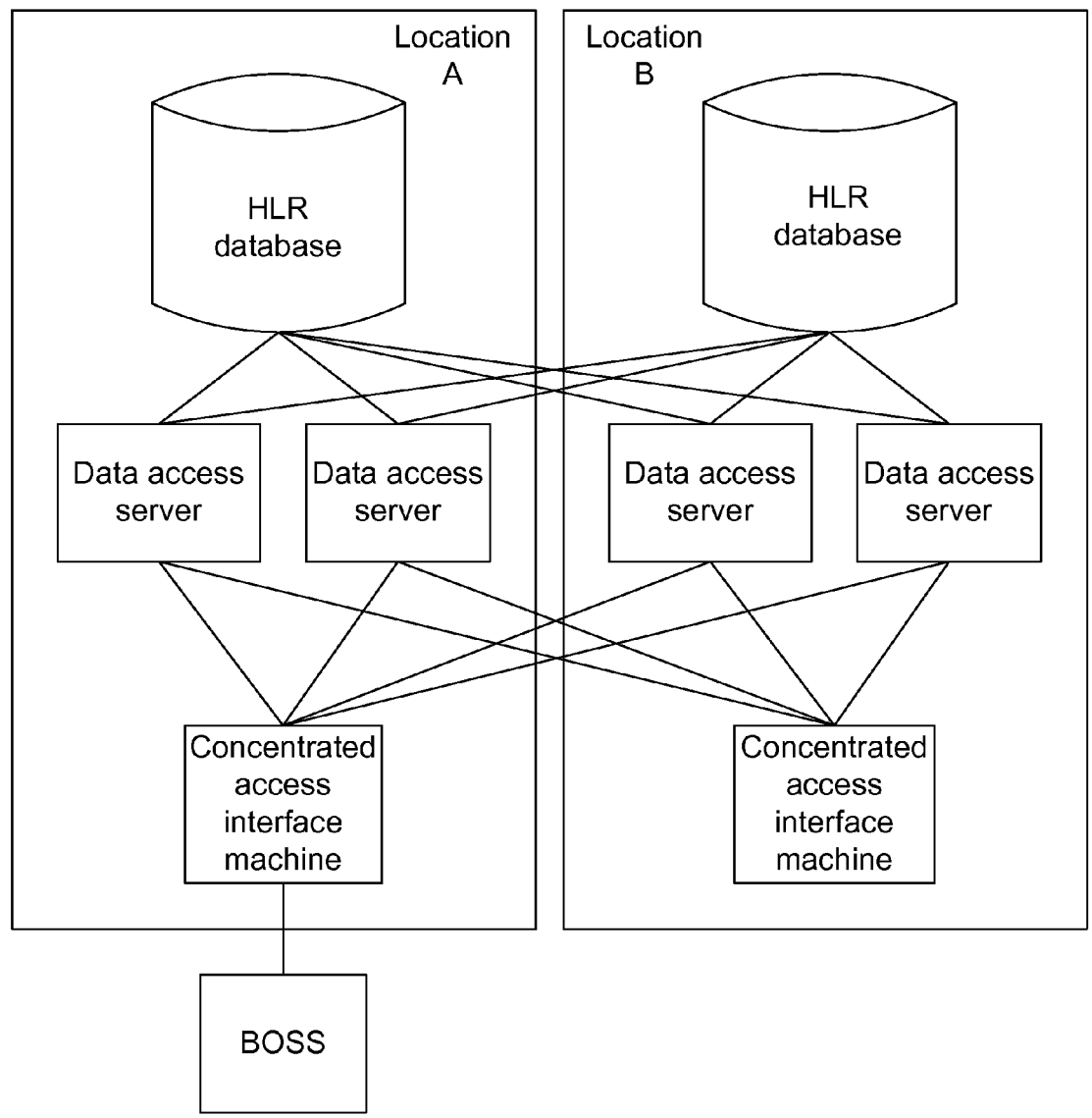
FIG. 2 is a schematic diagram of a system in Embodiment 1 of the disclosure.

FIG. 2 is a schematic diagram of a system in Embodiment 1 of the disclosure, with reference to the networking shown in FIG. 2, the system for implementing concentrated access of a BOSS includes: a plurality of HLR subsystems and at least one BOSS subsystem, wherein one of the plurality of HLR subsystems is specified for performing concentrated access of each BOSS subsystem;

the BOSS subsystem is configured to send a business processing request to the specified HLR subsystem;

the specified HLR subsystem is configured to forward the business processing request to a corresponding non-specified HLR subsystem; and the non-specified HLR subsystem is configured to feed business processing information back to the BOSS subsystem by the specified HLR subsystem.

The HLR subsystem includes an HLR database, a concentrated access interface machine and at least one data access server, wherein the concentrated access interface machine of the specified HLR subsystem is configured to set up connection with a data access server of each HLR subsystem and exchange the business processing information between the BOSS subsystem and a data access server of each HLR subsystem.

The concentrated access interface machine of the HLR subsystem specified for concentrated access is further configured to query and select an object to which the request is to be sent according to user identifiers included in the business processing request.

The concentrated access interface machine of the HLR subsystem specified for concentrated access is further configured to select a data access server according to a current load condition of each data access server when a data access server for receiving the business processing information cannot be determined.

The concentrated access interface machine of the HLR subsystem specified for concentrated access is further configured to update a historical distribution record of the business processing information according to an exchange condition of the business processing information.

Figure 3:
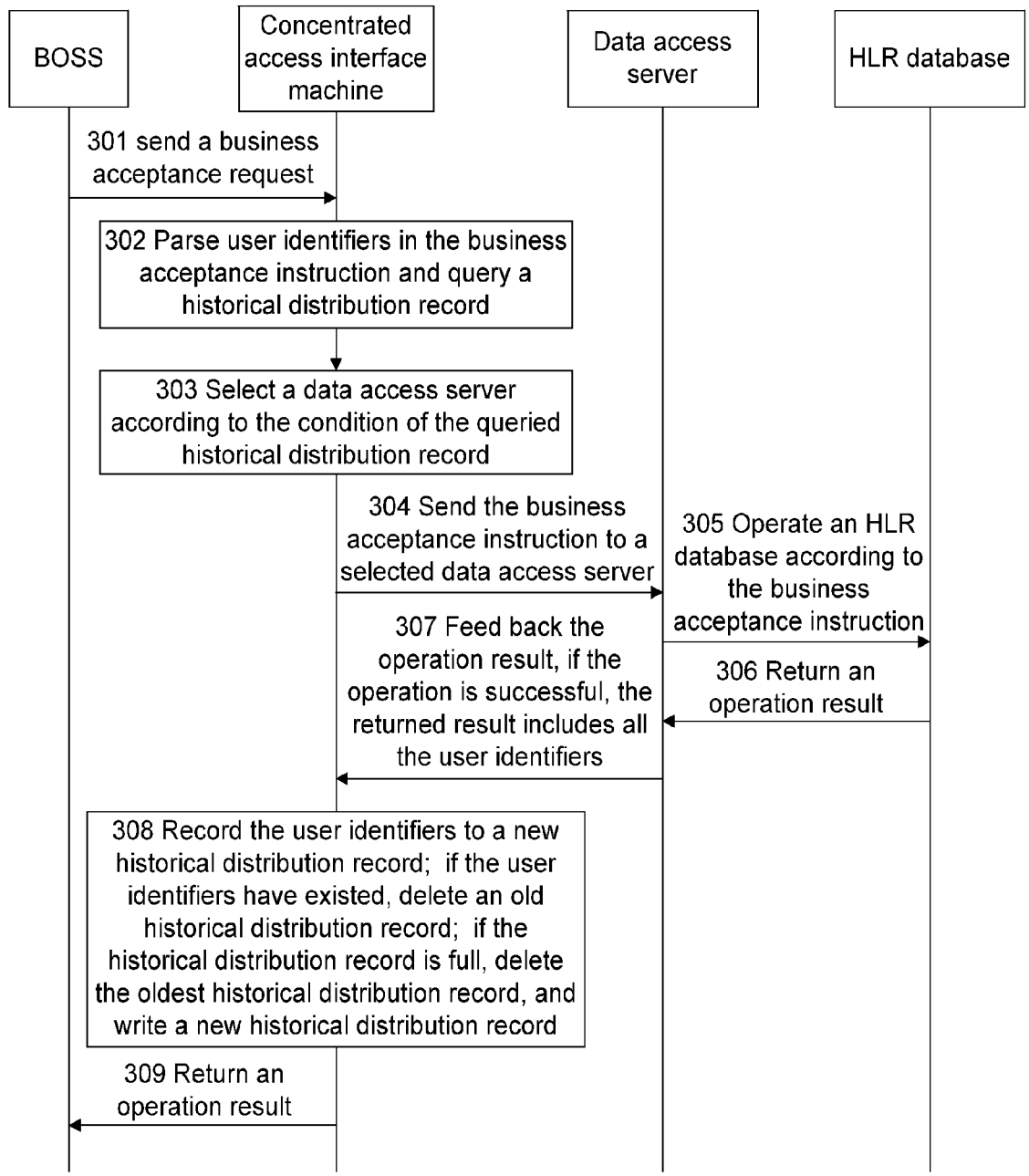
FIG. 3 is a diagram showing a flow of a method in Embodiment 1 of the disclosure.

With respect to FIG. 2, the concentrated access interface machine directly accesses a data access server at each location of the distributed HLR, the access process is as shown in FIG. 3, including the following steps.

Step 301: The BOSS sends a business acceptance request to the concentrated access interface machine.

Step 302: The concentrated access interface machine parses the user identifiers in the business acceptance instruction and queries the historical distribution record.

Step 303: The concentrated access interface machine selects a data access server according to a condition of the queried historical distribution record.

If the user identifiers do not exist in the historical distribution record, the concentrated access interface machine selects a data access server according to the current load condition of the data access server;

if the user identifiers exist in the historical distribution record and a data access server corresponding to the historical distribution record is normal, the concentrated access interface machine selects the data access server to process the current business acceptance instruction; and if the user identifiers exist in the historical distribution record but a data access server corresponding to the historical distribution record is abnormal, the concentrated access interface machine temporarily delays processing the business acceptance message, then timely checks the state of the target data access server; if the data access server is still abnormal after 3 attempts (the times can be flexibly configured), the concentrated access interface machine deletes the historical distribution record of the user identifiers and reselects a data access server according to the current load condition of the data access server.

Step 304: The concentrated access interface machine sends the business acceptance instruction to the selected data access server.

Step 305: The data access server operates an HLR database according to the business acceptance instruction.

Step 306: The HLR database returns an operation result to the data access server.

Step 307: The data access server returns the operation result to the concentrated access interface machine, if the operation is successful, the returned result includes all the user identifiers.

Step 308: The concentrated access interface machine records the user identifiers to a new historical distribution record; if the user identifiers have existed, an old historical distribution record is deleted; if the historical distribution record is full, the oldest historical distribution record is deleted, and a new historical distribution record is written.

Step 309: The concentrated access interface machine returns the operation result to the BOSS.

Embodiment 2

Figure 4:
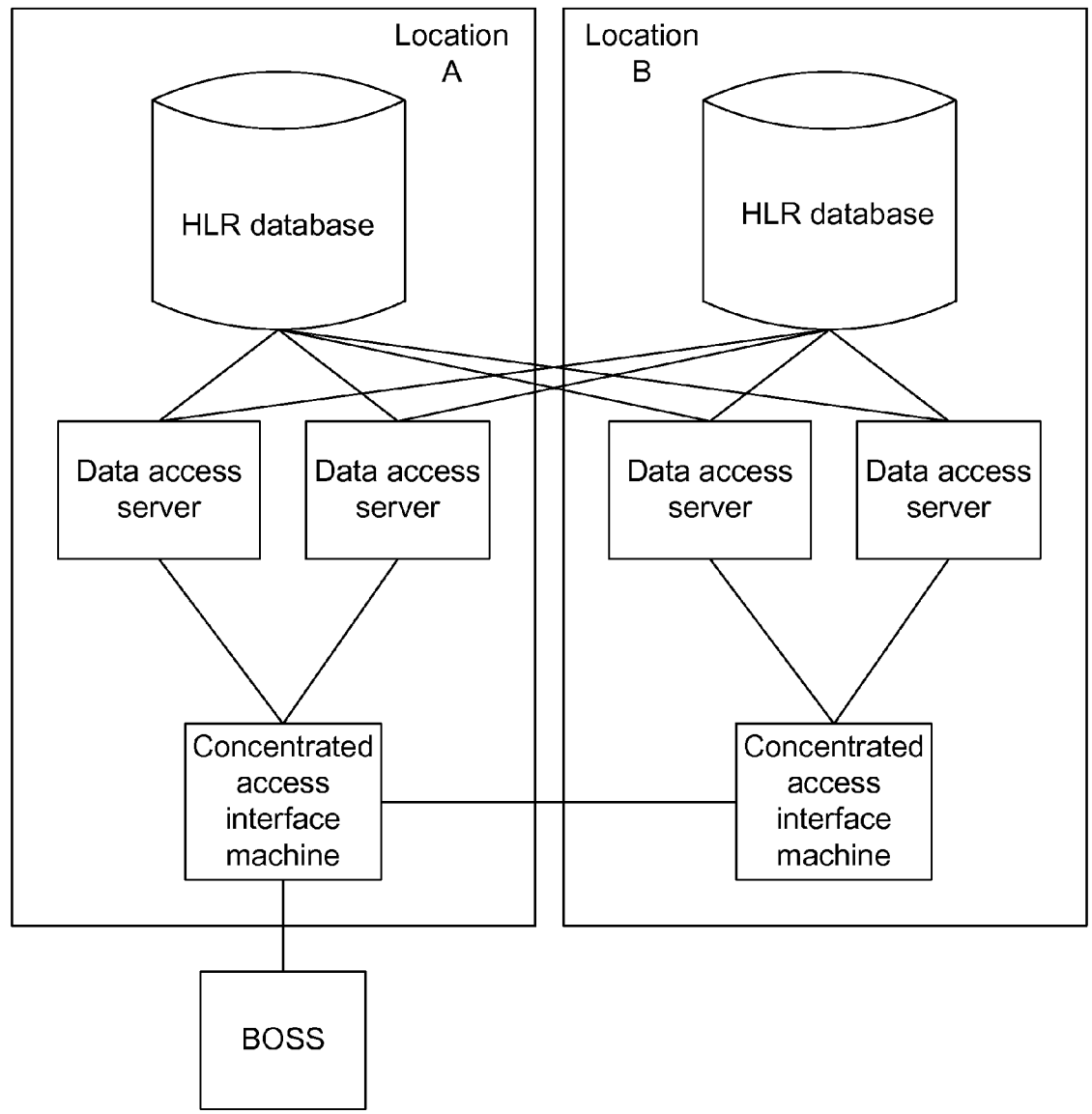
FIG. 4 is a schematic diagram of a system in Embodiment 2 of the disclosure.

FIG. 4 is a schematic diagram of a system in Embodiment 2 of the disclosure, with reference to the networking shown in FIG. 4, the system for implementing concentrated access of a BOSS includes: a plurality of HLR subsystems and at least one BOSS subsystem, wherein one of the plurality of HLR subsystems is specified for performing concentrated access of each BOSS subsystem;

the BOSS subsystem is configured to send a business processing request to the specified HLR subsystem;

the specified HLR subsystem is configured to forward the business processing request to a corresponding non-specified HLR subsystem; and the non-specified HLR subsystem is configured to feed business processing information back to the BOSS subsystem by the specified HLR subsystem.

The HLR subsystem includes an HLR database, a concentrated access interface machine and at least one data access server, wherein the concentrated access interface machine of the specified HLR subsystem is configured to set up connection with a concentrated access interface machine of each HLR subsystem and exchange remote business processing information between the BOSS subsystem and a concentrated access interface machine of a remote HLR subsystem.

The concentrated access interface machine of the HLR subsystem specified for concentrated access is further configured to query and select an object to which the request is to be sent according to user identifiers included in the business processing request.

The concentrated access interface machine of the HLR subsystem specified for concentrated access is further configured to select a data access server according to a current load condition of each data access server when a data access server for receiving the business processing information cannot be determined.

The concentrated access interface machine of the HLR subsystem specified for concentrated access is further configured to update a historical distribution record of the business processing information according to an exchange condition of the business processing information.

Figure 5:
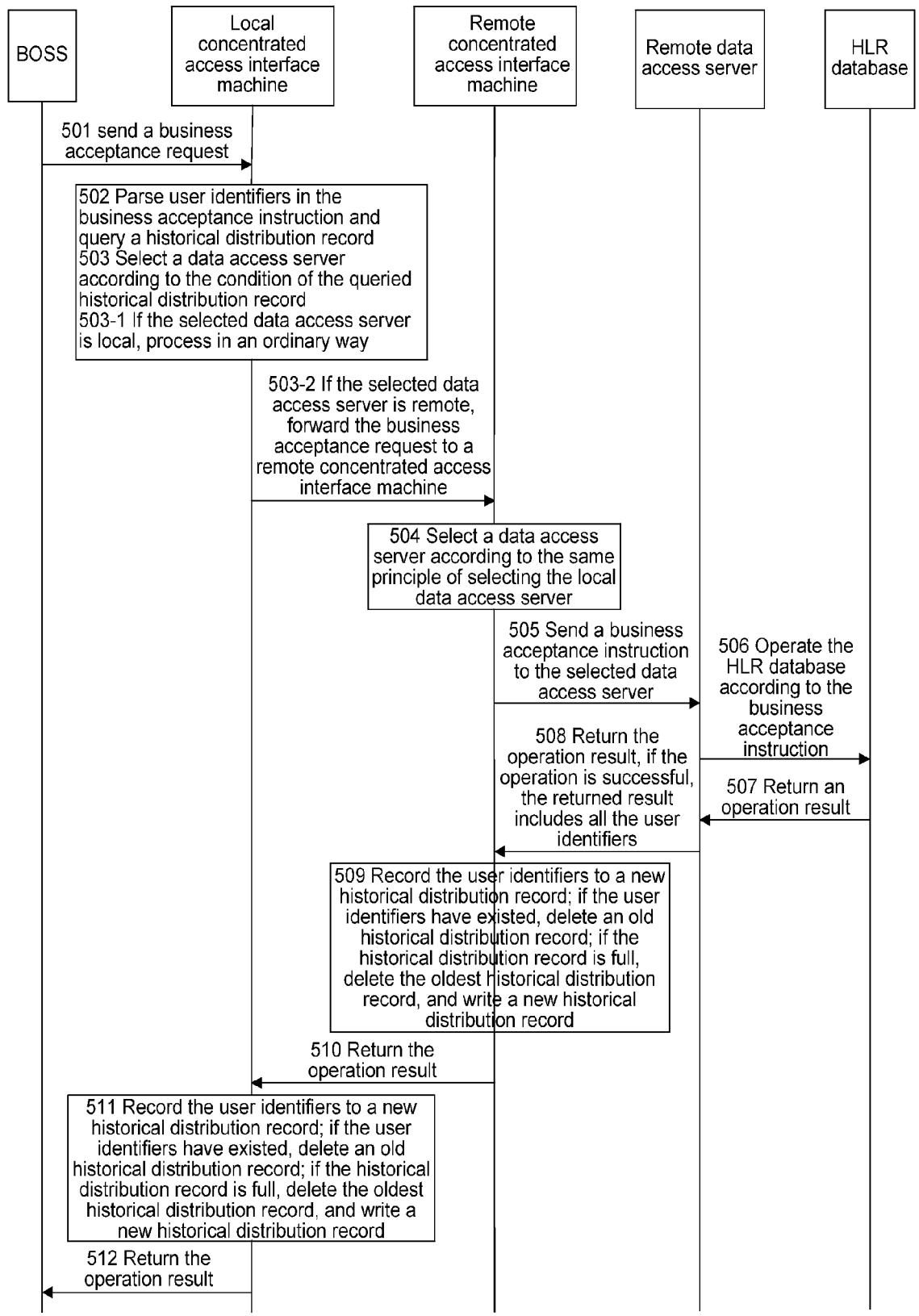
FIG. 5 is a diagram showing a flow of a method in Embodiment 2 of the disclosure.

With respect to FIG. 4, the concentrated access interface machine only accesses a local data access server; if it needs to access a remote data access server, a local concentrated access interface machine is needed for forwarding; the access process is as shown in FIG. 5, including the following steps.

Step 501: The BOSS sends a business acceptance request to a local concentrated access interface machine.

Step 502: The local concentrated access interface machine parses the user identifiers in the business acceptance instruction and queries the historical distribution record.

Step 503: The local concentrated access interface machine selects a data access server according to a condition of the queried historical distribution record, and a selection principle is as shown in Step 303.

Step 503-1: If the selected data access server is local, a processing flow is as shown in Step 304 to Step 309.

Step 503-2: If the selected data access server is remote, the local concentrated access interface machine forwards the business acceptance request to a remote concentrated access interface machine.

Step 504: The remote concentrated access interface machine receives the business acceptance request and selects a data access server according to the same principle of selecting the local data access server.

Step 505: The remote concentrated access interface machine sends the business acceptance instruction to the selected data access server.

Step 506: The data access server operates an HLR database according to the is business acceptance instruction.

Step 507: The HLR database returns an operation result to the data access server.

Step 508: The data access server returns the operation result to the remote concentrated access interface machine, if the operation is successful, the returned result includes all the user identifiers.

Step 509: The remote concentrated access interface machine records the user identifiers to a new historical distribution record; if the user identifiers have existed, an old historical distribution record is deleted; if the historical distribution record is full, the oldest historical distribution record is deleted, and a new historical distribution record is written.

Step 510: The remote concentrated access interface machine returns the operation result to the local concentrated access interface machine.

Step 511: The local concentrated access interface machine records the user identifiers to a new historical distribution record; if the user identifiers have existed, an old historical distribution record is deleted; if the historical distribution record is full, the oldest historical distribution record is deleted, and a new historical distribution record is written.

Step 512: The local concentrated access interface machine returns the operation result to the BOSS.

To sum up, by adopting the method of this disclosure, the concentrated access interface machine can automatically select a data access server to process a business acceptance instruction according to load states of a plurality of data access servers in the distributed HLR system, so that the overload of a business acceptance message is better controlled.

By the method, the concentrated access interface machine can select a proper data access server to process a business acceptance instruction according to user identifiers; and the selection mechanism can ensure that an optimal data access server is selected to process the acceptance instruction based on the principle of firstly processing the business acceptance instruction firstly received from the same user, so as to achieve the optimal correctness and performance.

What described above is the further detailed description of the present disclosure with reference to specific embodiments, and the scope of the disclosure should not be construed as being limited to the embodiments set forth herein. Various simple deduction or replacement made by those skilled in the art within the concept of the present disclosure shall fall within the protection scope of the present disclosure.

The invention claimed is:

1. A system for implementing concentrated access of a Business Operations Support System (BOSS), comprising: a plurality of Home Location Register (HLR) subsystems and at least one BOSS subsystem;
   one of the plurality of HLR subsystems being specified for performing concentrated access of each BOSS subsystem;
   the BOSS subsystem being configured to send a business processing request to the specified HLR subsystem;
   the specified HLR subsystem being configured to forward the business processing request to a corresponding non-specified HLR subsystem; and
   the non-specified HLR subsystem being configured to receive the business processing request forwarded by the specified HLR subsystem and feed business processing information back to the BOSS subsystem by the specified HLR subsystem.

2. The system for implementing concentrated access of a BOSS according to claim 1, wherein the HLR subsystem comprises an HLR database, a concentrated access interface machine and at least one data access server; and
   a concentrated access interface machine of the specified HLR subsystem is configured to set up connection with a data access server of each HLR subsystem and exchange the business processing information between the BOSS subsystem and a data access server of the non-specified HLR subsystems by itself.

3. The system for implementing concentrated access of a BOSS according to claim 2, wherein
   the concentrated access interface machine of the specified HLR subsystem is further configured to, through user identifiers included in the business processing request, query and select an object to which the request is to be sent.

4. The system for implementing concentrated access of a BOSS according to claim 2, wherein
   the concentrated access interface machine of the specified HLR subsystem is further configured to select a data access server according to a current load condition of each data access server when a data access server for receiving the business processing information cannot be determined.

5. The system for implementing concentrated access of a BOSS according to claim 2, wherein
   the concentrated access interface machine of the specified HLR subsystem is further configured to update a historical distribution record of the business processing information according to an exchange condition of the business processing information.

6. The system for implementing concentrated access of a BOSS according to claim 1, wherein the HLR subsystem comprises an HLR database, a concentrated access interface machine and at least one data access server; and
   a concentrated access interface machine of the specified HLR subsystem is configured to set up connection with a concentrated access interface machine of each HLR subsystem and exchange remote business processing information between the BOSS subsystem and a concentrated access interface machine of a remote HLR subsystem by itself.

7. The system for implementing concentrated access of a BOSS according to claim 6, wherein
   the concentrated access interface machine of the specified HLR subsystem is further configured to, through user identifiers included in the business processing request, query and select an object to which the request is to be sent.

8. The system for implementing concentrated access of a BOSS according to claim 6, wherein
   the concentrated access interface machine of the specified HLR subsystem is further configured to update a historical distribution record of the business processing information according to an exchange condition of the business processing information.

9. A method for implementing concentrated access of a Business Operations Support System (BOSS), comprising:
   specifying a Home Location Register (HLR) subsystem for performing concentrated access of each BOSS subsystem;
   sending a business processing request by the BOSS subsystem to the specified HLR subsystem, and forwarding the business processing request by the specified HLR subsystem to a corresponding HLR subsystem; and
   feeding business processing information back to the BOSS subsystem by the corresponding HLR subsystem through the specified HLR subsystem.

10. The method for implementing concentrated access of a BOSS according to claim 9, wherein the querying the business processing request and forwarding the business processing request to the corresponding HLR subsystem by the specified HLR subsystem is: a concentrated access interface machine of the specified HLR subsystem parses the business processing request, queries it in a historical distribution record of the business processing information, determines a data access server corresponding to the business processing request, and forwards the business processing request to the data access server; and
   the feeding business processing information back to the BOSS subsystem by the corresponding HLR subsystem through the specified HLR subsystem is: the data access server feeds the business processing information back to the BOSS subsystem through a concentrated access interface machine of the specified HLR subsystem.

11. The method for implementing concentrated access of a BOSS according to claim 10, wherein the concentrated access interface machine of the specified HLR subsystem queries and selects an object to which the request is to be sent through user identifiers included in the business processing request.

12. The method for implementing concentrated access of a BOSS according to claim 10, further comprising: selecting one data access server by the concentrated access interface machine of the specified HLR subsystem according to a current load condition of each data access server when a data access server for receiving the business processing information cannot be determined.

13. The method for implementing concentrated access of a BOSS according to claim 10, further comprising: updating a historical distribution record of the business processing information by the concentrated access interface machine of the specified HLR subsystem according to an exchange condition of the business processing information after the corresponding HLR subsystem feeds the business processing information back to the BOSS subsystem through the specified HLR subsystem.

14. The method for implementing concentrated access of a BOSS according to claim 9, wherein the querying the business processing request and forwarding the business processing request to the corresponding HLR subsystem by the specified HLR subsystem is: a concentrated access interface machine of the specified HLR subsystem parses the business processing request and queries it in a historical distribution record of the business processing information; the concentrated access interface machine of the specified HLR subsystem uploads a local business processing request to a corresponding local data access server; and the concentrated access interface machine of the specified HLR subsystem determines a concentrated access interface machine corresponding to a remote business processing request and forwards the remote business processing request to the corresponding concentrated access interface machine which then uploads the business processing request to a corresponding data access server; and the feeding business processing information back to the BOSS subsystem by the corresponding HLR subsystem through the specified HLR subsystem is: the remote data access server feeds the business processing information back to the BOSS subsystem through the local and remote concentrated access interface machines which forward the information.

15. The method for implementing concentrated access of a BOSS according to claim 14, wherein the concentrated access interface machine of the specified HLR subsystem queries and selects an object to which the request is to be sent through user identifiers included in the business processing request.

16. The method for implementing concentrated access of a BOSS according to claim 14, further comprising: updating a historical distribution record of the business processing information by the concentrated access interface machine of the specified HLR subsystem according to an exchange condition of the business processing information after the corresponding HLR subsystem feeds the business processing information back to the BOSS subsystem through the specified HLR subsystem.

* * * * *